Figure 1:
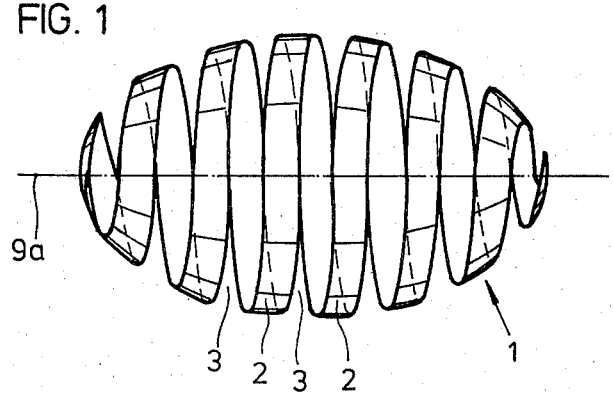

United States Patent [19]

Müllender

[11] 4,387,111
[45] Jun. 7, 1983

[54] HELICAL OR SPIRAL-SHAPED BULBOUS FOOD PRODUCT

[76] Inventor: Gernot Müllender, Renning Weg 213, 6973 Boxberg-Schweigern, Fed. Rep. of Germany

[21] Appl. No.: 279,029

[22] Filed: Jun. 30, 1981

[30] Foreign Application Priority Data

Jul. 2, 1980 [DE] Fed. Rep. of Germany ....... 3025093

[51] Int. Cl.³ .......................... A23L 1/212; A23P 1/00
[52] U.S. Cl. ......................................... 426/615; 83/56; 83/733; 99/538; 426/512; 426/518; 426/637
[58] Field of Search ............... 426/104, 615, 637, 512, 426/518; 83/56, 733; 99/537, 538, 567, 594

[56] References Cited

U.S. PATENT DOCUMENTS

| | | | |
|---|---|---|---|
| 782,292 | 2/1905 | Walter | 99/537 X |
| 1,361,776 | 12/1920 | Rosenfeld | 426/518 |
| 2,489,581 | 11/1949 | Mason | 99/537 X |
| 3,153,436 | 10/1964 | Chesley | 99/538 |
| 3,211,202 | 10/1965 | Mason | 99/537 X |
| 3,874,259 | 4/1975 | Chambos et al. | 83/733 X |
| 3,881,406 | 5/1975 | Perez | 99/594 X |
| 4,137,839 | 2/1979 | Couture et al. | 99/594 X |
| 4,170,174 | 10/1979 | Ditty et al. | 99/538 |

FOREIGN PATENT DOCUMENTS

680486  2/1964  Canada ................. 426/518

*Primary Examiner*—Arthur L. Corbin
*Attorney, Agent, or Firm*—Anthony A. O'Brien

[57] ABSTRACT

A helical or spiral-shaped food, particularly a potato, is produced by means of being cut in a way that a helical or spiral ribbon is produced having a series of loops around a center whereby the loops define a space from each other. The space corresponds to the shape of the loops and is filled with at least one similar, helical or spiral ribbon.

2 Claims, 10 Drawing Figures

HELICAL OR SPIRAL-SHAPED BULBOUS FOOD PRODUCT

The invention pertains to a ribbon-shaped food which is produced by being cut from bulbous growths, such as potatoes, beets, apples and the like.

The so-called french fries are especially known which are produced by being cut from potatoes into longitudinal cuboids. The so-called wavy french fries, which are somewhat wave-shaped in their longitudinal direction, are a variation of this form. In view of this form the substances for further treatment, like for example liquid fat for frying or water to boil, can only have a quicker effect if they are not contiguous during the treatment.

The invention is based on the problem of dividing a ribbon-shaped food of the kind identified above by cutting such that a clear proportionality results, wherein the effect should also be attained that additives, like herbs, for example, can be brought into contact more easily with the pertinent food than is the case with longitudinal french fries.

The food formed as claimed is characterized by a ribbon looped around a center such that the loops maintain self-supporting a space between each other which corresponds to the form of the loops and contains, after the cutting process at least one similar, extractable looped ribbon.

In view of this formation several desirable effects are attained consecutively. First, the fast possibility of affect of substances for treatment is maintained because of the form as looped, self-supportive ribbon with spaces between the loops. Moreover the spaces lying between the loops and surrounded thereby make the addition of additives possible by means of which a connection results from the beginning for the serving of the food which especially simplifies the garnishing.

The food itself takes the form thereby of the original outer form of the bulbous growth, which gives the prepared food an especial aesthetic effect. Moreover, it contains a relatively large, coherent mass of the original bulbous growth so that the proportional distribution to a prepared meal is made simpler. Finally, it is of special importance that in the production of the necessary spaces between the self-supporting loops from the meat of the original growth a similarly looped ribbon is cut out which exposes by its extraction the spaces and thus consecutively forms a second looped ribbon with corresponding spaces. Not considering a peeling process which might be necessary, no garbage develops by the ribbon-shaped cutting described above.

It is known per se to cut a radish into a helix comprising contiguous loops which, however, then makes it necessary to draw apart the helix to add a treatment substance, namely salt. With such a cutting process the advantages given above in connection with the claimed form cannot be attained.

An especially advantageous form of the looped ribbon is obtained in that the loops progress as a helix around an axis forming the center. The helix can be formed advantageously by means of a uniform, rotating and axial advance of the pertinent growth in a relative movement against at least one cutting edge progressing vertically to the movement axis. In the case of only one such cutting edge the helix automatically results from the meat of the growth which fills out the space, wherein the last helix need only be pulled out of the first helix so as to obtain two similar self-supportive helices with the spaces between their loops. If several cutting edges are used then correspondingly more helices are produced which, however, results in that the spaces between the loops of the helices are especially large.

The cutting edge can be formed as tensioned, stationary or rotating wire or thread. In this case care is to be taken by forced advance that the necessary incline of the helix results with the rotation movement. It is also possible, however, to form the cutting edge as on a front edge of a double helix surface. In this case the cutting edge progresses essentially in the same direction as the wire or thread mentioned above wherein however the double helix surfaces lying behind the cutting edge gives the growth, because of its incline, the axial advance with its rotation.

It is advisable to half or divide the pertinent growth before the helix cut. The prepared food then lies better on the plate.

Another kind of form of the looped ribbon consists in allowing the loops to progress as spirals around a stationary point forming the center. In this case the spaces between the loops are also filled after the cutting with the meat of the pertinent growth so that at least one further spiral develops which corresponds to the first spiral. In the case of such a form the advantages mentioned above also result.

The cutting of the spirals takes place advantageously by cutting out with a punching tool which contains at least two, spirally-shaped cutting edges which are nested within each other and progress from the stationary point. In the case of the use of only two spiral-shape formed blades naturally only two spirals are produced from the meat of the pertinent growth which are pushed apart from each other only vertically to their radial extension. It is possible thereby to cut the pertinent growth either before the cutting out or thereafter into slices, by means of which ribbons then develop with corresponding small cross sections.

Figure 2:
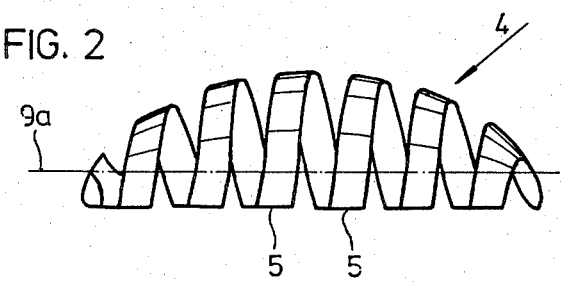
Figure 3:
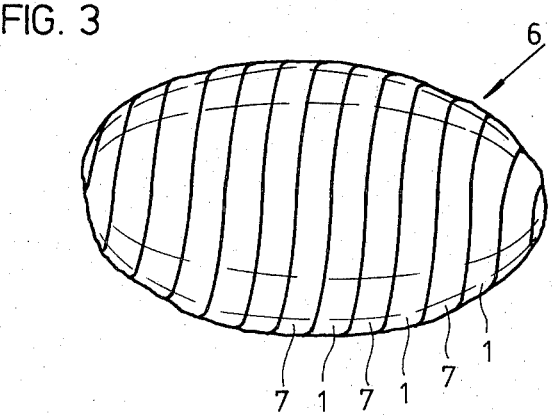
Figure 4:
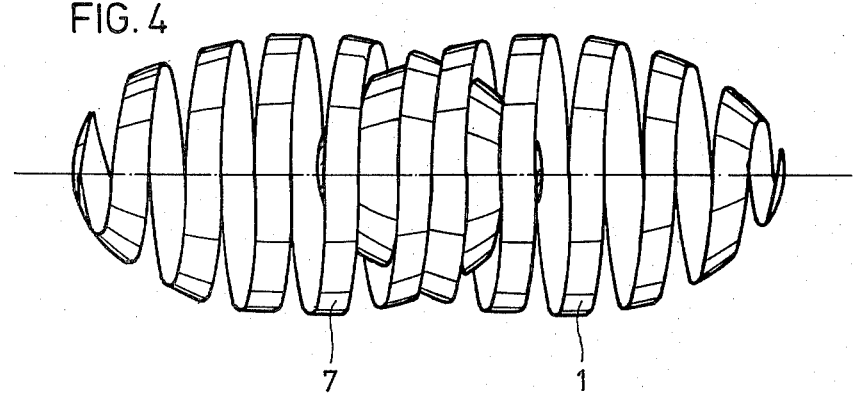
Figure 5:
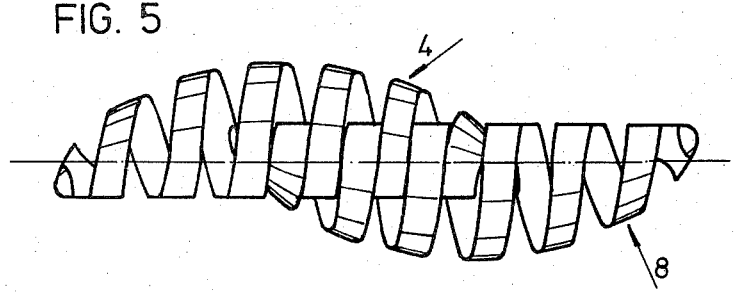
Figure 7:
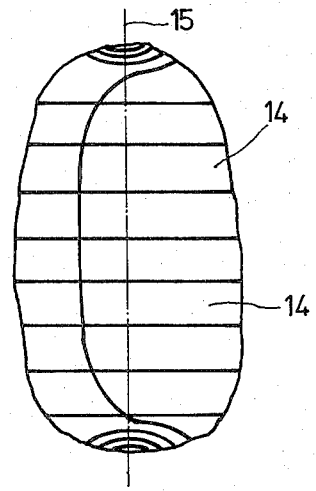
Figure 6:
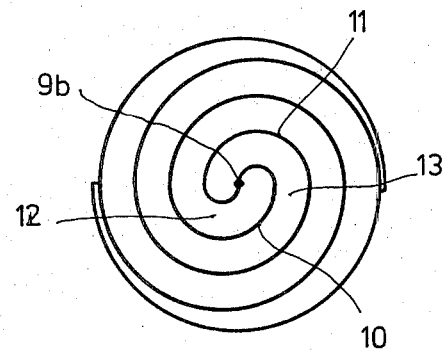
Figure 8:
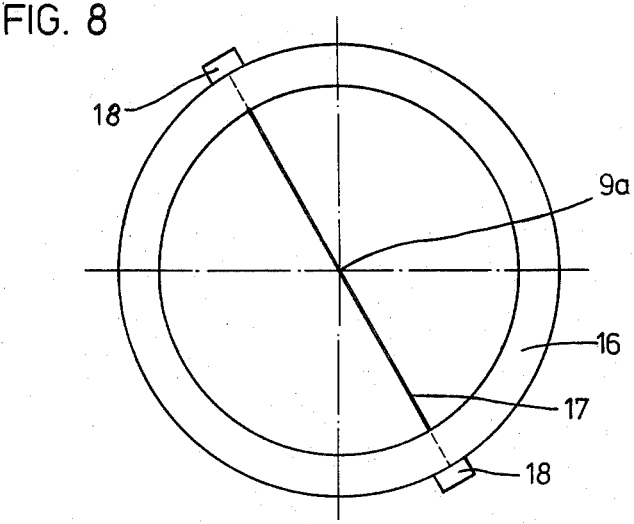
Figure 9:
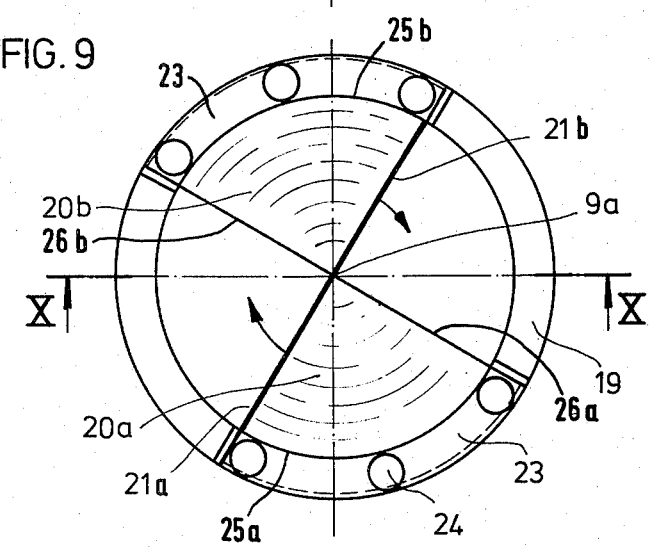
Figure 10:
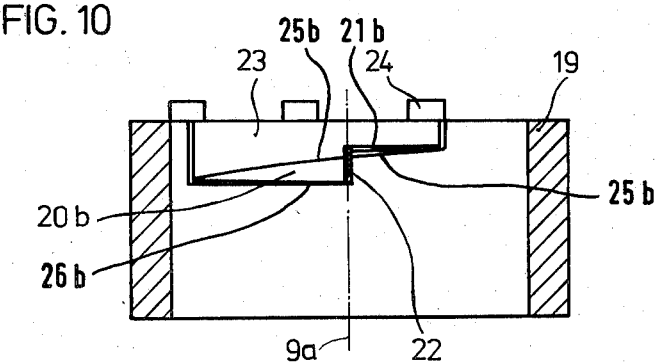

Working examples of the invention are represented in the figures. It is shown:

FIG. 1: a side view of a helix cut out of a potato,

FIG. 2: a helix cut out of a potato previously halfed,

FIG. 3: the pertinent potato directly after the cutting by means of a cutting edge progressing vertically to the advance axis, the one helix filling out completely the spaces between the other helix, FIG. 4: the two helices from FIG. 3, however unscrewed by half, FIG. 5: the position of two helices corresponding to FIG. 4 which resulted from a potato previously halfed, FIG. 6: a spirally cut growth, FIG. 7: the cut out growth according to FIG. 6 with additional slice cuts, FIG. 8: a tool to cut helices with a tensioned wire, FIG. 9: a tool to cut helices with a cutting knife progressing according to the kind of double helix surface, FIG. 10: a cut according to the line X—X of FIG. 9.

In FIG. 1 the food cut from a potato in the form of a helix 1 is represented which as regards its form is similar to a helical spring converging inwardly at both its ends. As can be seen the spaces 3, which correspond to the loops 2 as regards their width, lie between the loops 2. The helix 1 consists thereby of the self-supporting loops 2 so that the helix 1 on the one hand can be quickly cooked or fried because of the easy accessibility of the meat and on the other hand keeps its shape in the form shown in FIG. 1 so that the impression of a potato still remains when on the plate. The spaces 3 can be easily filled out thereby by additions such as herbs or the like, which can be easily held in the spaces 3.

If a potato is halved before the helix cut is used, then the form of a helix 4 as seen in FIG. 2 is the result, which corresponds for the most part to the helix 1 of FIG. 1, not regarding the previous halfing. The helix 4 only possesses a placement surface formed by the cutting surface 5 on which the helix 4 can be easily placed on a plate.

A potato 6 is represented in FIG. 3 directly after the cutting by means of a cutting edge progressing vertically to the movement axis. This cutting process will be explained in more detail below in connection with FIGS. 8 to 10. Two helices develop thereby of which each fills out the spaces of the other helix. The one helix 1 corresponds thereby to the helix 1 in FIG. 1. Its spaces are filled out by the loops of the helix 7. The two helices 1 and 7 can thus be pulled apart as is shown in FIG. 4.

According to FIG. 4 the helix 1 is pulled out of the helix 7 by about half. FIG. 4 clearly shows thereby how a helix by this pulling out exposes the spaces of the other helix. Consequently two separate helices develop, one such being shown in FIG. 1.

An illustration corresponding for the most part to FIG. 4 is shown in FIG. 5 based on the helix 4 of FIG. 2. The helix 8 is pulled out of the helix 4 by about half, this being before a halved potato.

FIG. 6 shows a potato from which two spirals have been cut, the punching tool consisting of two knives connected at a center and looped spirally therearound. The center corresponds to the stationary point 9b. The cutting lines 10 and 11 develop thereby, between which lie the spirals 12 and 13.

It is also possible to cut a potato into slices before or after the cutting out described by means of FIG. 6, as is shown in FIG. 7. The potato shown here shows the slices 14. Together with the cutting out as in FIG. 6 and the slices 14, 2 spirals 12 and 13 result respectively for each slice 14, which can be pulled apart according to the direction of the axis 15 shown in FIG. 7. The height of the slices 14 and the width of the spirals 12 and 13 can be formed thereby such that the spirals 12 and 13 have approximately square cross sections. In the case of the use of spirals on the one hand, the possibility also results of the addition and holding of additives and on the other hand of a good placement on a plate.

The cutting by means of the helix treated as in FIGS. 1 to 5 is now explained. FIG. 8 shows a simple cutting tool, consisting of the stationary ring 16, over the middle of which the cutting wire 17 is tensioned which is kept tensioned by means of the clamp member 18 in the ring 16. Under the precondition that sufficiently thin wire with appropriate stability is used, a potato can be cut with the arrangement of FIG. 8 for example such that the two helices 1 and 7 shown in FIG. 3 are produced. A potato is moved forward in relative movement with constant axial advance (i.e. vertical to the direction of the wire 17) and consecutively is continuously rotated in opposition to the wire 17 so that the wire 17 penetrates into the meat of the potato and cuts out of this the loops of the two spirals 1 and 7 of FIG. 3, the loops of the one spiral filling out the spaces of the other spiral.

Another cutting tool, which has the same effect in principle, is shown in FIG. 9. The double helix surfaces 20a–20b are represented in the ring 19, in which the cutting edge 21a–21b shown by the heavily drawn line is formed on the front edge of the double helix surface 20a–20b. The cutting edge 21a–21b corresponds thereby to the wire 17 of FIG. 8. The double helix surfaces 20a–20b, extending a long line 25a–25b to the clamp piece 23 and forming the cutting knife, progress with an incline which corresponds to the incline of the loops of the helix to be cut out so that the incline of the double helix surface 20a–20b practically forces the further, correct advance of the potato after the penetration of the cutting edge 21a–21b into the meat of a potato. The border of the double helix surface 20a–20b being opposite to the cutting edge 21a–21b is indicated by the reference numeral 26a respectively 26b. The arrows shown in FIG. 9 show the rotation direction of the cutting edge 21a–21b with respect to an advanced potato, this being a relative movement. This means that the potato can be advanced and/or rotated or the shown tool can be advanced or rotated.

The form of the tool shown in FIG. 9 can also be seen from FIG. 10 which shows a cut along the line X—X in FIG. 9. As can be seen the double helix surface 20a–20b is formed by a thin metal plate which stands vertical in the center of the ring 19 and forms the cross section 22. This metal plate then progresses corresponding to the double helix surface 20a–20b, of which in FIG. 10 only the part 20b is to be seen. Furthermore in FIG. 10 the cutting edge 21b and the border 26b is shown as far as these parts border the part 20b of the double helix surface. Finally FIG. 10 also shows line 25b.

The metal sheet forming the double helix surface 20a–20b is fixed in the ring 19 between the clamp piece 23 by means of the screws 24 onto a corresponding groove in the ring 19.

Reference is also made to the fact that of course, as was mentioned above, bulbous growths other than potatoes can be processed by the means shown above. In the case of processing apples, for example, the advantage also arises that the substances to be used for treatment, like e.g. sugar or dough, can have a fast and intensive affect.

I claim:

1. A helical-shaped food which is produced by means of being cut from bulbous growths, such as potatoes, beets and apples, comprising a helical ribbon having a series of loops around a center, said loops defining a space from each other, which space corresponds to the shape of the loops and which space is filled with at least one similar removable helical ribbon.

2. A spiral-shaped food which is produced by means of being cut from bulbous growths, such as potatoes, beets and apples, comprising a spiral ribbon having a series of loops around a center, said loops defining a space from each other, which space corresponds to the shape of the loops and which space is filled with at least one similar removable spiral ribbon.

* * * * *